US00RE41473E

(19) United States
(12) Reissued Patent
Hirata et al.

(10) Patent Number: US RE41,473 E
(45) Date of Reissued Patent: Aug. 3, 2010

(54) BOARD-TO-BOARD ELECTRICAL CONNECTOR ASSEMBLY

(75) Inventors: Toshihisa Hirata, Kanagawa (JP); Masami Sasao, Tokyo (JP)

(73) Assignee: Molex Incorporated, Lisle, IL (US)

(21) Appl. No.: 11/592,314

(22) Filed: Nov. 2, 2006

Related U.S. Patent Documents

Reissue of:
(64) Patent No.: 6,811,411
Issued: Nov. 2, 2004
Appl. No.: 10/661,686
Filed: Sep. 12, 2003

(51) Int. Cl.
*H01R 9/09* (2006.01)

(52) U.S. Cl. ..... 439/74; 439/660
(58) Field of Classification Search ..... 439/74, 439/660, 65, 81, 83, 82, 295, 290; 361/774, 361/769, 785; 174/261
See application file for complete search history.

(56) References Cited

U.S. PATENT DOCUMENTS

| | | | |
|---|---|---|---|
| 5,181,855 | A | 1/1993 | Mosquera et al. |
| 5,224,866 | A | 7/1993 | Nakamura et al. |
| 5,310,357 | A | 5/1994 | Olson |
| 5,395,250 | A | 3/1995 | Englert, Jr. et al. |
| 5,639,248 | A | 6/1997 | Yagi |
| 5,727,956 | A | 3/1998 | Mitra et al. |
| 5,971,809 | A | 10/1999 | Ho |
| 5,975,916 | A | 11/1999 | Okura |
| 6,338,630 | B1 | 1/2002 | Dong |
| 6,540,561 | B1 | 4/2003 | Masumoto |

FOREIGN PATENT DOCUMENTS

| | | | |
|---|---|---|---|
| EP | 0 795 929 | A2 | 9/1997 |
| EP | 1 096 609 | A1 | 5/2001 |
| JP | 11-74024 | | 7/1989 |
| JP | 07-036370 | | 7/1995 |
| JP | 09-259979 | | 10/1997 |
| JP | 10-162913 | | 6/1998 |
| JP | 2000-260509 | | 9/2000 |
| JP | 2001-126789 | | 5/2001 |
| JP | 2003-163054 | | 6/2003 |
| JP | 2003-217711 | | 7/2003 |
| JP | 2004-273277 | | 9/2004 |
| WO | 03/065513 | A1 | 8/2003 |

*Primary Examiner*—Alexander Gilman
(74) *Attorney, Agent, or Firm*—Timothy M. Morella

(57) ABSTRACT

A board-to board electrical connector assembly is provided for effecting a connection between two circuit boards. The assembly includes a first connector having a dielectric housing for mounting on a first circuit board. A plurality of first terminals are 5 mounted on the dielectric housing and each terminal includes a tail portion for connection to an appropriate circuit trace on the first circuit board and a convex contact portion defining a continuous arcuate contact surface. A second connector has a dielectric housing for mounting on a second circuit board. A plurality of second terminals are mounted on the dielectric housing of the second connector and each second terminal includes a tail portion 10 for connection to an appropriate circuit trace on the second circuit board, and a contact projection for sliding over the continuous arcuate contact surface of the convex contact portion of the first terminals upon mating of the connectors.

30 Claims, 4 Drawing Sheets

BOARD-TO-BOARD ELECTRICAL CONNECTOR ASSEMBLY

Matter enclosed in heavy brackets [ ] appears in the original patent but forms no part of this reissue specification; matter printed in italics indicates the additions made by reissue.

FIELD OF THE INVENTION

This invention generally relates to the art of electrical connectors and, particularly, to an electrical connector assembly for effecting a connection between two circuit boards.

BACKGROUND OF THE INVENTION

A variety of electrical connectors have been used to make electrical connections between the circuits on different printed circuit boards. These printed circuit boards must be joined together with connectors in a manner to effectively and reliable interconnect the circuits on one circuit board to the circuits on another circuit board. This is done by a pair of mating connectors which are surface mount connectors and may include a male or plug connector mateable with a female or receptacle connector to form a board-to-board electrical connector assembly.

As stated above, both connectors of the electrical connector assembly are surface mount connectors. Both connectors typically have a low profile and have some form of mechanism to lock the connectors together. Locking mechanisms which have been used heretofore range from simple frictional forces between the terminals of the mating connectors to positive latching detents or recesses on the dielectric housings of the connectors. Frictional forces between the terminals have not been consistently adequate to hold the connectors together and, in some instances, the frictional forces have been so great that mating the connectors have required very high forces. Latching detents between the terminals can work well, but the latching devices must be located very accurately at preselected distances which requires manufacturing tolerances which are not practical to maintain with such connectors. If these tolerances are not maintained, too much "play" or movement exists between the boards. Latching detents between the connector housings have not worked well because movement of the plastic surfaces over one another creates abrasion which increases the insertion and withdrawal forces and which permanently wears the parts. The present invention is directed to solving these problems by providing a system which holds the connectors together and, in fact, does so with minimal mating forces.

SUMMARY OF THE INVENTION

An object, therefore, of the invention is to provide a new and improved board-to-board electrical connector assembly for effecting a connection between two circuit boards.

In the exemplary embodiment of the invention, the connector assembly includes a first connector having a dielectric housing for mounting on a first circuit connector. A plurality of first terminals are mounted on the dielectric housing. Each terminal includes a tail portion for connection to an appropriate circuit trace on the first circuit connector, and a convex contact portion defining a continuous arcuate contact surface. A second connector has a dielectric housing for mounting on a second circuit board. A plurality of second terminals are mounted on the dielectric housing of the second connector and each second terminal includes a tail portion for connection to an appropriate circuit trace on the second circuit board. Each second terminal includes a contact projection for sliding over the continuous arcuate contact surface of a first terminal upon mating of the connectors.

With the above construction and interengagement of the terminals of the connector assembly, initial engagement of the contact projection of each second terminal with the convex contact portion of a first terminal is at minimal engaging forces which increase as the contact projection slides over the convex contact portion and then decreases to allow the connectors to mate and the circuit boards to come together with minimal mating forces at a mated condition of the connectors.

According to one aspect of the invention, the contact projection of each second terminal is at the distal end of a flexible contact arm which comprises one leg of a U-shaped contact section of the second terminal. The dielectric housing of the first connector includes a plug portion mateable in the U-shaped contact section of the second terminals. The convex contact portions of the first terminals are at one side of the plug portion for engagement with the contact projections of the second terminals of the second connector.

As disclosed herein, the U-shaped contact section of each second terminal is connected to a mounting section for mounting the second terminal in the dielectric housing of the second connector. The tail portion of each second terminal projects from the mounting section thereof. According to another aspect of the invention, the first terminals are generally U-shaped, with each first terminal having one leg of the U-shape defining the convex contact portion and the other leg of the U-shape defining a mounting portion for mounting the first terminal in the dielectric housing of the first connector. The tail portion of the first terminal is at a distal end of the mounting portion thereof. The housing of the first connector has an open space between the convex contact portion and the mounting portion of each first terminal so that the convex contact portion is free to flex upon engagement with the second terminal of the second connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 9:
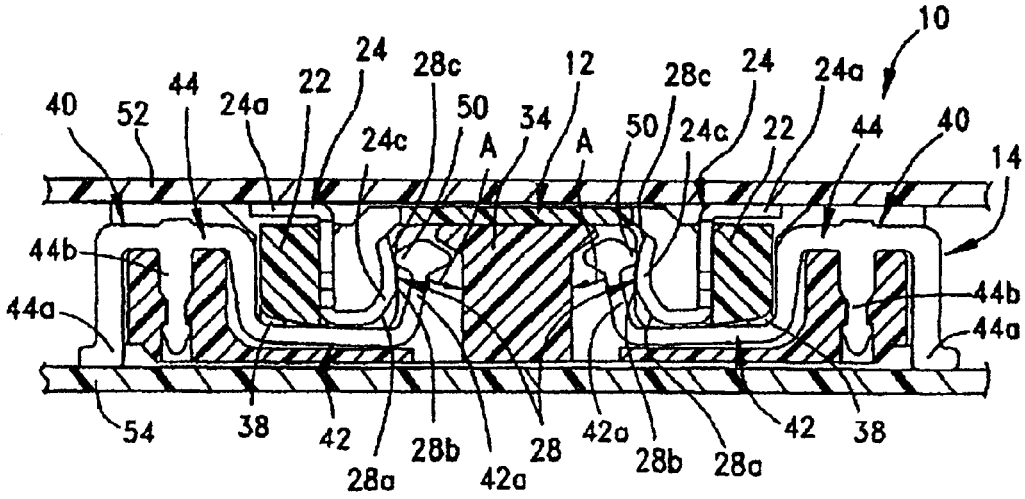
FIG. 9 is a vertical section through the connector assembly of the invention, with the plug and receptacle connectors in mated condition.

Referring to the drawings in greater detail, the invention is embodied in an electrical connector assembly, generally designated 10 in FIG. 9, which includes a first or plug connector, generally designated 12 and shown specifically in FIGS. 1–4. The plug connector is mateable with a second or receptacle connector, generally designated 14, which is shown specifically in FIGS. 5–8.

Figure 1:
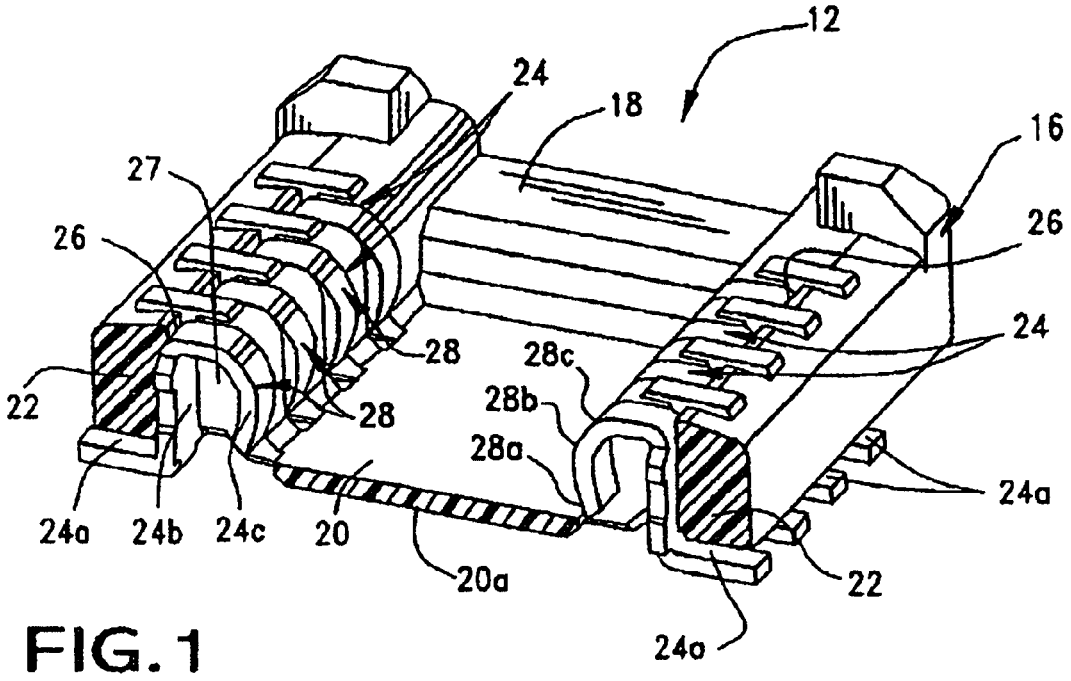
FIG. 1 is a vertically sectioned perspective view of the first or plug connector of the connector assembly according to the invention.
Figure 5:
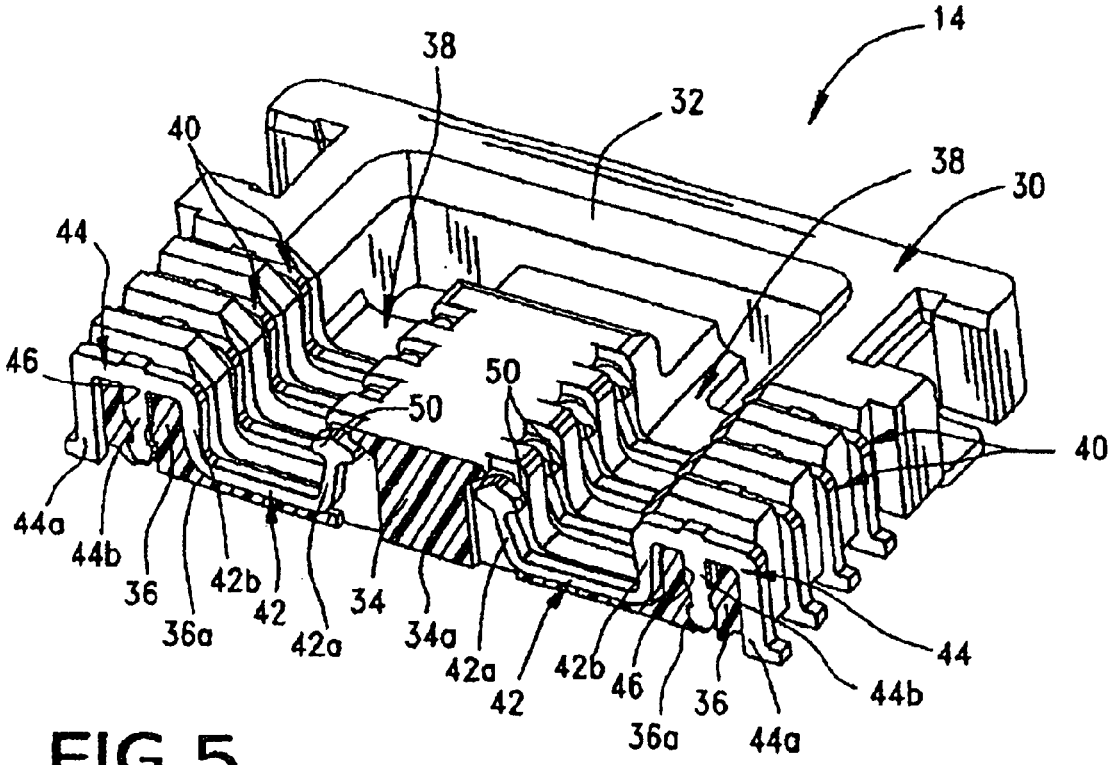
FIG. 5 is a vertically sectioned perspective view of the second or receptacle connector of the connector assembly according to the invention.
Figure 2:
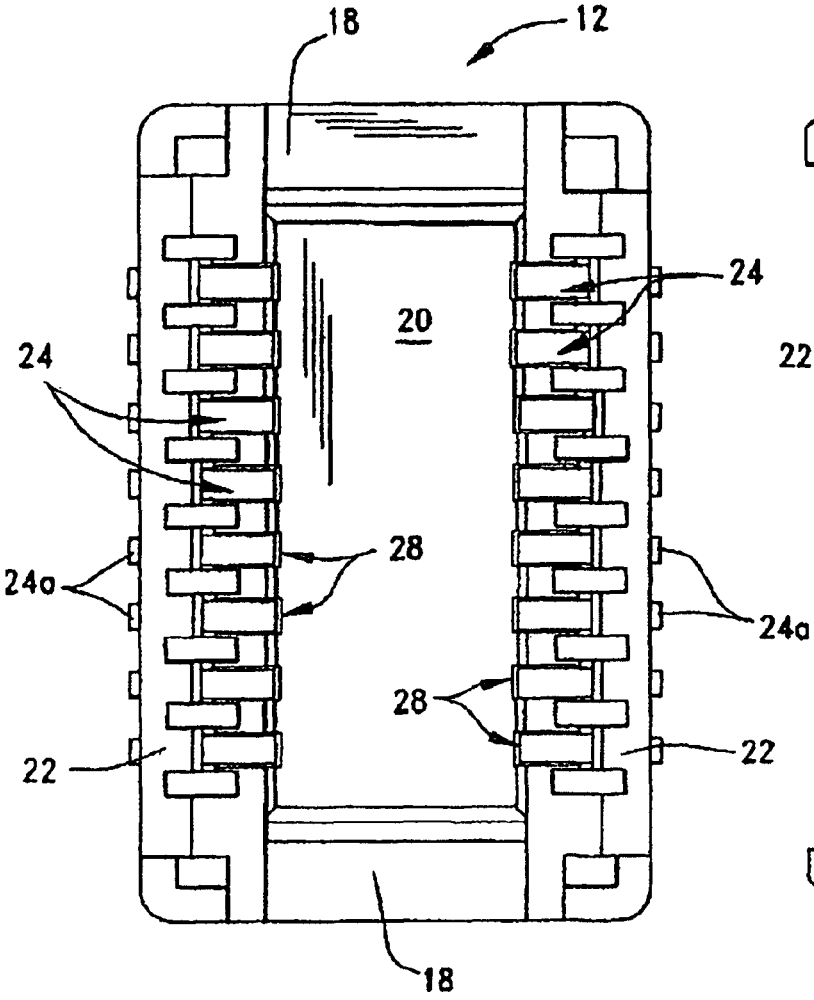
FIG. 2 is a top plan view of the plug connector.
Figure 3:
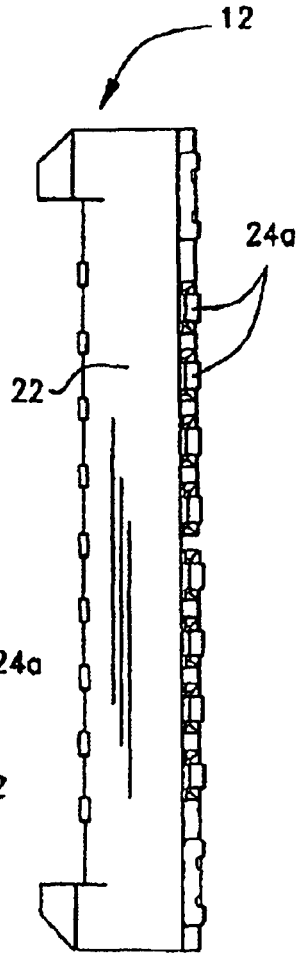
FIG. 3 is a side elevational view of the plug connector.
Figure 4:
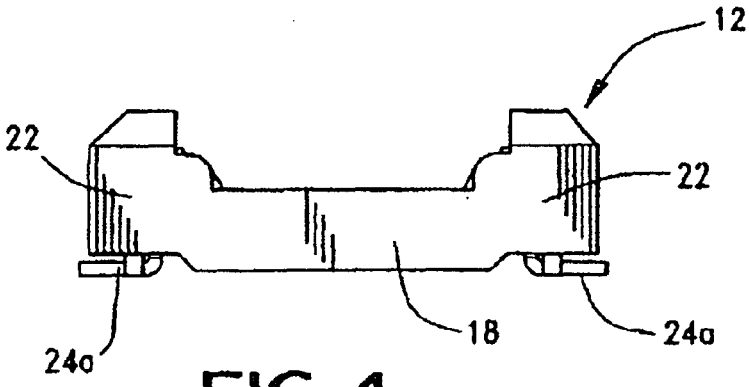
FIG. 4 is an end elevational view of the plug connector.
Figure 6:
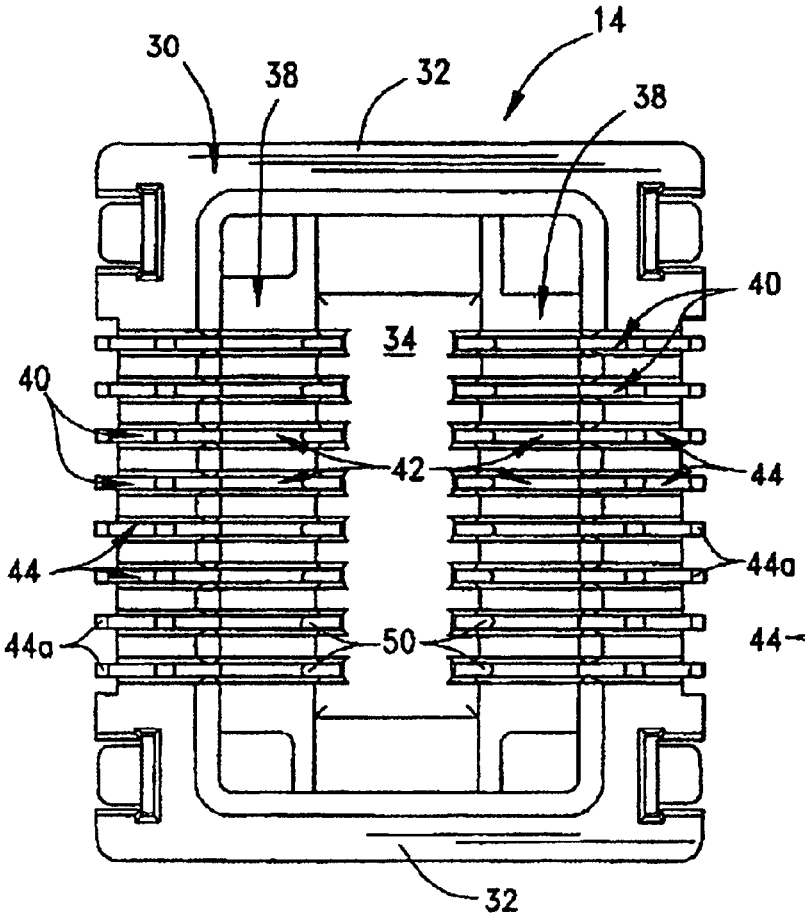
FIG. 6 is a top plan view of the receptacle connector.
Figure 7:
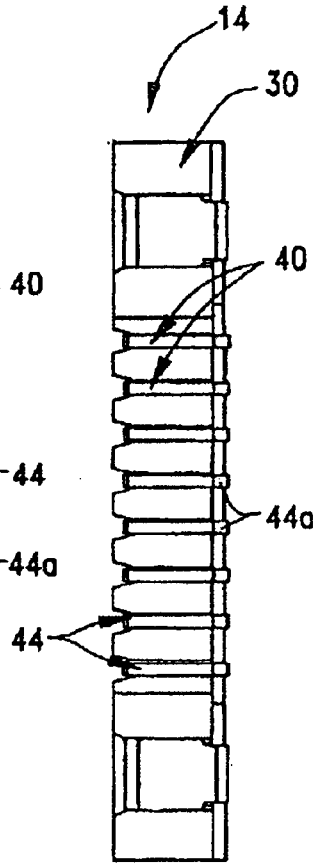
FIG. 7 is a side elevational view of the receptacle connector.
Figure 8:
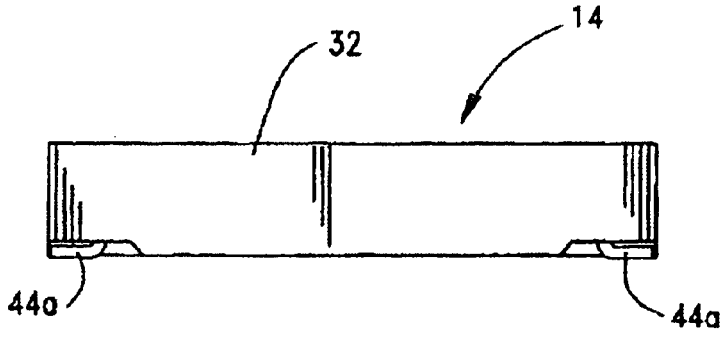
FIG. 8 is an end elevational view of the receptacle connector.

Referring first to FIGS. 1–4, the first or plug connector 12 includes a dielectric housing, generally designated 16, which may be molded of plastic material or the like. The housing is elongated as best seen in FIG. 2 and includes a pair of opposite ends 18 joined by a base wall 20 which defines an outside surface 20a for surface mounting the plug connector on a first circuit board (not shown). A pair of elongated plug portions 22 of housing 16 extend between opposite ends 18 along opposite sides of base wall 20. A plurality of first or plug terminals, generally designated 24, are mounted in housing 16 of plug connector 12. As best seen in FIG. 1 and 2, the terminals are mounted along an inside surface 26 of each plug portion 22 of the housing, thereby defining two spaced rows of terminals facing inwardly of the connector. Each plug terminal 24 includes a tail portion 24a which is generally flush with surface 20a of base wall 20 for connection to an appropriate circuit trace on the first circuit board. The remainder of each plug terminal 24 is generally U-shaped with one leg 24b of the U-shape defining a mounting portion for mounting the terminal in plug portion 22 of housing 16. Leg 24b has teeth on opposite edges thereof for skiving into the plastic material of the housing. An opposite leg 24c of the U-shape defines a convex contact portion of each terminal. The housing defines an open space 27 between mounting portion 24b and convex contact portion 24c so that the convex contact portion is free to flex upon engagement with a terminal of the receptacle connector as described hereinafter.

The convex contact portion 24c of each plug terminal 24 defines a continuous arcuate contact surface, generally designated 28 in FIG. 1. Each continuous arcuate contact surface 28 includes an initial surface portion 28a as seen in FIG. 1, along with a maximum force surface portion 28b and a final latched surface portion 28c, all for purposes described hereinafter.

Referring to FIGS. 5–8, receptacle connector 14 includes a dielectric housing, generally designated 30, which, like plug connector 12, is elongated and includes opposite ends 32. The housing includes a center rib 34 and a pair of side ribs 36 which extend between opposite ends 32 and define a pair of elongated receptacles, generally designated 38, which receive plug portions 22 and plug terminals 28 of plug connector 12, as will be seen hereinafter.

A plurality of second or receptacle terminals, generally designated 40, are mounted on each side rib 36 of housing 30 of receptacle connector 14. Each receptacle terminal 40 includes a generally U-shaped contact section, generally designated 42, and a mounting section, generally designated 44. The mounting section includes a tail portion 44a for connection to an appropriate circuit trace on a second circuit board (not shown). The bottom of tail portion 44a is generally flush with a bottom surface 36a of each side rib 36 and a bottom surface 34a of center rib 34. Therefore, receptacle connector 14 is designed for surface mounting on the second circuit board. Mounting section 44 on each receptacle terminal 40 includes a toothed mounting leg 44b for insertion into a respective mounting hole 46 in each side rib 36 of housing 30.

The generally U-shaped contact section 42 of each receptacle terminal 40 includes a first leg 42a spaced from a second leg 42b to define an open space therebetween which is coincident with one of the receptacles 38 which run the length of the receptacle connector. Leg 42a of the U-shaped contact section 42 forms a flexible contact arm which has an inwardly directed contact projection 50 on the distal end of the flexible contact arm. FIG. 9 shows the first or plug connector 12 fully mated with the second or receptacle connector 14. The plug connector is shown surface mounted to a first circuit board 52, and receptacle connector 14 surface is mounted to a second circuit board 54.

FIG. 9 shows the plug connector mated downwardly into the receptacle connector. However, it should be understood that the board-to-board connector assembly 10 is omnidirectional in use and function, and this orientation of the respective connectors 12 and 14 is but for illustration purposes. With that understanding, it can be seen that plug portions 22 and convex contact portions 24c of plug connector 12 are inserted into receptacles 38 formed by the U-shaped contact sections 42 of receptacle terminals 40. During mating, flexible contact arms 42a of the receptacle terminals are biased inwardly in the direction of arrows "A", as contact projections 50 at the distal ends of flexible contact arms 42a ride along continuous arcuate contact surfaces 28 of convex contact portion 24c of plug terminals 24. During the mating process, contact projections 50 first engage initial surface portions 28a of the continuous arcuate contact surfaces at minimal engaging forces. As contact projections 50 ride over surface portions 28b, maximum forces are encountered until contact projections 50 reach the final latched surface portions 28c whereat minimal mating forces are encountered at the fully mated condition of the connectors. The combined forces of all of the contact projections 50 of all of the receptacle terminals with the final latched surface portions 28c of all of the plug terminals provide a good latching means between the two connectors with little or no additional insertion forces. The continuous arcuate contact surfaces 28 are immune to any tolerance problems of the positive latching mechanisms of the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A board-to board electrical connector assembly for effecting a connection between two circuit boards, comprising:

a first connector having a dielectric housing for mounting on a first circuit board;

a plurality of first terminals mounted on the dielectric housing and each terminal including a tail portion for connection to an appropriate circuit trace on the first circuit board and a convex contact portion defining a continuous arcuate contact surface;

a second connector having a dielectric housing for mounting on a second circuit board; a plurality of second terminals mounted on the dielectric housing of the second connector and each second terminal including a tail portion for connection to an appropriate circuit trace on the second circuit board and a contact projection for continuously sliding over the continuous arcuate contact surface of the convex contact portion of said first terminals from the first mating of the connectors until and including the final mated condition of the connectors; and whereby initial engagement of the contact projection of each second terminal with the convex contact portion of a respective one of the first terminals is at minimal engaging forces which increase as the contact projection slides over the convex contact portion and then decreases to allow the connectors to mate and the circuit boards to come together with minimal mating forces at the mated condition of the connectors.

2. The board-to-board electrical connector assembly of claim 1 wherein said first terminals are generally U-shaped with each first terminal having one leg of the U-shape defining said convex contact portion and the other leg of the U-shape defining a mounting portion for mounting the first terminal in the dielectric housing of the first connector.

3. The board-to-board electrical connector assembly of claim 2 wherein the tail portion of said first terminal is at an end of the mounting portion of the first terminal opposite said convex contact portion.

4. The board-to-board electrical connector assembly of claim 2 wherein the housing of said first connector has an open space between the convex contact portion and the mounting portion of a respective one of first terminals as that the convex contact portion is free to flex upon engagement with the second terminal of the second connector.

5. The board-to-board electrical connector assembly of claim 1 wherein the contact projection of each second terminal is at the distal end of a flexible contact arm.

6. The board-to-board electrical connector assembly of claim 5 wherein said flexible contact arm comprises one leg of a U-shaped contact section of the second terminal.

7. The board-to-board electrical connector assembly of claim 6 wherein said U-shaped contact section of each second terminal is connected to a mounting section for mounting the second terminal in the dielectric housing of the second connector.

8. The board-to-board electrical connector assembly of claim 7 wherein the tail portion of each second terminal projects from the mounting section thereof.

9. A board-to board electrical connector assembly for effecting a connection between two circuit boards, comprising:

a plug connector having a dielectric housing for mounting on a first circuit board; a plurality of plug terminals mounted on the dielectric housing and each terminal including a tail portion for connection to an appropriate circuit trace on the first circuit board, each plug terminal being generally U-shaped with one leg of the U-shape defining a mounting portion for mounting the plug terminal in the dielectric housing and the other leg defining a convex contact portion having a continuous arcuate contact surface;

a receptacle connector having a dielectric housing for mounting on a second circuit board; a plurality of receptacle terminals each including a tail portion for connection to an appropriate circuit trace on the second circuit board, each receptacle terminal having a U-shaped contact section with one leg of the U-shape forming a flexible contact arm having a contact projection at the distal end thereof for continuously sliding over the continuous arcuate contact surface of the convex contact portion of a plug terminal from the first mating of the connectors as the plug terminals are inserted into the U-shaped contact sections of the receptacle terminals until and including a final mating condition; and whereby initial engagement of the contact projection of each receptacle 20 terminal with the convex contact portion of a respective one of the plug terminals is at minimal engaging forces which increase as the contact projection slides over the convex contact portion and then decreases to allow the connectors to mate and the circuit boards to come together with minimal mating forces at a mating condition of the connectors.

10. The board-to-board electrical connector assembly of claim 9 wherein the tail portion of said plug terminal is at an end of the mounting portion of the plug terminal opposite said convex contact portion.

11. The board-to-board electrical connector assembly of claim 9 wherein the housing of said plug connector has an open space between the convex contact portion and the mounting portion of a respective one of plug terminals so that the convex contact portion is free to flex upon engagement with the receptacle terminal of the receptacle connector.

12. The board-to-board electrical connector assembly of claim 9 wherein said U-shaped contact section of each receptacle terminal is connected to a mounting section for mounting the receptacle terminal in the dielectric housing of the receptacle connector.

13. The board-to-board electrical connector assembly of claim 12 wherein the tail portion of each receptacle terminal projects from the mounting section thereof.

14. A board-to board electrical connector assembly for effecting a connection between two circuit boards, comprising:

a first connector having a dielectric housing for mounting on a first circuit board;

a plurality of first terminals mounted on the dielectric housing and each terminal including a tail portion for connection to an appropriate circuit trace on the first circuit board and a convex contact portion defining a continuous arcuate contact surface; a second connector having a dielectric housing for mounting on a second circuit board; a plurality of second terminals mounted on the dielectric housing of the second connector and each second terminal including a tail portion for connection to an appropriate circuit trace on the second circuit board and a contact projection, at a distal end of a flexible contact arm which comprises one leg of a U-shaped contact section, for sliding over the continuous arcuate contact surface of the convex contact portion of said first terminals upon mating of the connectors;

the dielectric housing of said first connector includes a plug portion mateable in the U-shaped contact section of said second terminals, with the convex contact portions of the first terminals being at one side of the plug portion for engagement with the contact projections of the second terminals of the second connector; and whereby initial engagement of the contact projection of each second terminal with the convex contact portion of a respective one of the first terminals is at minimal engaging forces which increase as the contact projection slides over the convex contact portion and then decreases to allow the connectors to mate and the circuit boards to come together with minimal mating forces at a mated condition of the connectors.

*15. A low profile board mountable receptacle connector that is mateable with a board mountable plug connector having terminals formed with a convex contact portion defining a continuous arcuate contact surface for effecting a connection between two circuit boards in parallel relation to each other, comprising:*

*a low profile dielectric housing including a mounting face for mounting the plug connector on a first circuit board*

*and a mating face formed with a receptacle area for receiving a plug connector mountable on a second circuit board,*

*a plurality of receptacle terminals each mountable on said dielectric housing from the mating side thereof,*

*said receptacle terminals each including a tail portion for connection to an appropriate circuit trace on the first circuit board, and*

*a U-shaped contact section with one leg forming a flexible contact arm having a free end extending upwardly toward said mating side and being engageable with continuous sliding movement over the continuous arcuate contact surface of the convex contact portion of a plug connector terminal from the first mating of the plug connector with the receptacle connector until and including the final mated connection of the plug connector with the mating connector.*

*16. The low profile board mountable receptacle connector of claim 15 in which said receptacle terminals each have a mounting portion extending into the receptacle housing from a mating side thereof.*

*17. The low profile board mountable receptacle connector of claim 15 in which said receptacle terminals each have a first mounting leg that defines said tail portion and which extends outwardly from said receptacle housing mounting face, said U-shaped contact section being connected to said first mounting leg at an end thereof opposite said tail portion, and a second mounting leg having a terminal end extending into said receptacle housing in opposite directed relation to said flexible contact arm.*

*18. The low profile board mountable receptacle connector of claim 17 in which said U-shaped contact section includes a second leg that defines an open space between said one leg that forms said flexible contact arm for permitting flexing of said contact arm relative to said second leg.*

*19. The low profile board mountable receptacle connector of claim 15 in which said one leg that forms said flexible contact arm has an enlarged receptacle terminal engaging portion at a distal end thereof.*

*20. The low profile board mountable receptacle connector of claim 15 in which said receptacle terminal tail portions are configured for surface mounting with said first circuit board.*

*21. The low profile board mountable receptacle connector of claim 15 in which said receptacle area of said housing is defined by a pair of elongated receptacle sections each having a respective row of said receptacle terminals configured to receive respective plug portions of a plug connector.*

*22. A low profile board mountable receptacle connector that is mateable with a board mountable plug connector having terminals formed with a convex contact portion defining a continuous arcuate contact surface for effecting a connection between two circuit boards in parallel relation to each other, comprising:*

*a low profile dielectric housing including a mounting face for mounting the plug connector on a first circuit board and a mating face formed with a receptacle area for receiving a plug connector mountable on a second circuit board,*

*a plurality of receptacle terminals each mountable on said dielectric housing,*

*said receptacle terminals each including a tail portion for connection to an appropriate circuit trace on the first circuit board, a mounting section for securement to said housing, and a U-shaped contact section including first and second legs which define an open space into which a plug portion of a plug connector is insertable, and one of said legs of said U-shaped section forming a flexible contact arm having a free end extending upwardly toward said mating side and being engageable with continuous sliding movement over the continuous arcuate contact surface of the convex contact portion of a plug connector terminal from the first mating of the plug connector with the receptacle connector until and including the final mated connection of the plug connector with the mating connector.*

*23. The low profile board mountable receptacle connector of claim 22 in which said mounting section of each receptacle terminal includes a mounting leg extending into the receptacle housing from a mating side thereof.*

*24. The low profile board mountable receptacle connector of claim 22 in which said mounting section of each receptacle terminal includes a first mounting leg, said tail portion of each receptacle terminal being connected at one end of said first mounting leg, said first mounting leg extending outwardly from said receptacle housing mounting face, said U-shaped contact section being connected to said first mounting leg at an end thereof opposite said tail portion, and a second mounting leg having a terminal end extending into said receptacle housing in opposite directed relation to said flexible contact arm.*

*25. A low profile board mountable plug connector that is mateable with a board mountable receptacle connector having terminals with respective contact portions for effecting a connection between two circuit boards in parallel relation to each other, comprising:*

*a low profile dielectric housing including a mating face for mating with a receptacle connector and a mounting face for mounting the plug connector on a first circuit board,*

*a plurality of plug terminals mounted on said dielectric housing each including a tail portion for connection to a circuit trace on the first circuit board,*

*said plug terminals each being generally U-shaped with one leg of the U-shape being directly connected to said tail portion and defining a mounting portion for mounting the plug terminal in the dielectric housing and the other leg defining a contact portion exposed for deflectable mating engagement with a receptacle terminal of a receptacle connector as an incident to relative movement of said plug and receptacle connectors in a direction perpendicular to the mating face of the plug connector, said other leg of the each plug connector terminal having a convex shape with a continuous arcuate contact surface substantially the length of the other leg which defines an initial arcuate contact surface portion at a terminal end section thereof, a maximum force arcuate surface portion at an intermediate section thereof, and a final latched arcuate surface portion at an end section opposite said terminal end section, said continuous arcuate contact surface being engageable by a contact portion of a respective receptacle connector terminal for continuous sliding movement of the receptacle connector terminal contact portion over the continuous arcuate contact surface from the first mating of the plug connector with the receptacle connector until and including the final mated connection of the plug connector with the mating receptacle connector, whereby upon initial engagement of a receptacle terminal of a receptacle connector as an incident to mating engagement of the plug and receptacle connectors, minimal engaging forces are incurred which progressively increase as the receptacle terminal slides over*

*the arcuate terminal contact surface and which then progressively decrease to permit minimal mating forces at a mating condition of the connectors.*

*26. The low profile board mountable plug connector of claim 25, in which said U-shaped plug terminals define an open space between said mounting portion and the contact portion for permitting free flexing of said contact portion upon engagement of a receptacle terminal of a receptacle connector.*

*27. The low profile board mountable plug connector of claim 25 in which said continuous arcuate contact surface of each plug U-shaped terminal is defined on an outer side of the other leg of each terminal.*

*28. The low profile board mountable plug connector of claim 25 in which said plug connector housing includes a generally rectangular shaped base and at least one elongated plug portion extending in upstanding relation to the base, and said plug terminals being mounted on said plug portion.*

*29. The low profile board mountable plug connector of claim 25 in which said plug connector housing includes a generally rectangular shaped base and two elongated plug portions extending in upstanding relation to the base, and said plug terminals being mounted on said elongated plug portions.*

*30. The low profile board mountable plug connector of claim 25 in which said plug terminals each have a tail portion that is surface mountable on the first circuit board.*

* * * * *